United States Patent
Shimbaru

(10) Patent No.: US 9,025,205 B2
(45) Date of Patent: May 5, 2015

(54) COLOR PROCESSING APPARATUS AND COLOR PROCESSING METHOD

(71) Applicant: Canon Kabushiki Kaisha, Tokyo (JP)

(72) Inventor: Susumu Shimbaru, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/469,480

(22) Filed: Aug. 26, 2014

(65) Prior Publication Data
US 2014/0362392 A1   Dec. 11, 2014

Related U.S. Application Data

(63) Continuation of application No. 13/671,406, filed on Nov. 7, 2012, now Pat. No. 8,842,339.

(30) Foreign Application Priority Data

Dec. 1, 2011   (JP) .................................. 2011-264126

(51) Int. Cl.
*H04N 1/60* (2006.01)
*G06K 15/02* (2006.01)

(52) U.S. Cl.
CPC ............ *G06K 15/1878* (2013.01); *H04N 1/603* (2013.01)

(58) Field of Classification Search
None
See application file for complete search history.

(56) References Cited

U.S. PATENT DOCUMENTS

| 2003/0161608 A1 | 8/2003 | Nishijima et al. |
| 2012/0287293 A1 | 11/2012 | Shimbaru |
| 2012/0321177 A1 | 12/2012 | Suzuki et al. |

FOREIGN PATENT DOCUMENTS

JP   2003-046796 A   2/2003

OTHER PUBLICATIONS

Brown, W.J., "Color Discrimination of Twelve Observers", Journal of the Optical Society of America, vol. 47, No. 2, 1957, pp. 137 to 143.
Melgosa et al., "Suprathreshold Color-Difference Ellipsoids for Surface Colors", Color Research and Application, vol. 22, No. 3, 1997, pp. 148 to 155.
McAdam, David L., "Visual Sensitivities to Color Differences in Daylight", Journal of the Optical Society of America, vol. 32, No. 5, 1942, pp. 247 to 274.
Luo et al., "Chromaticity-Discrimination Ellipses for Surface Colours", Color Research and Application, vol. 11, No. 1, 1986, pp. 25 to 42.
Chinese Office Action dated Feb. 2, 2015 from counterpart Chinese Patent Application No. 201210527610.8.

*Primary Examiner* — Barbara Reinier
*Assistant Examiner* — Christopher D Wait
(74) *Attorney, Agent, or Firm* — Fitzpatrick, Cella, Harper & Scinto

(57) ABSTRACT

The profile of a reference color space is acquired, and the acquired profile is converted into the profile of a uniform color appearance space which is a color space different from the reference color space. An evaluation value of color in the profile of the uniform color appearance space is calculated, and the profile of the uniform color appearance space is corrected based on the calculated evaluation value. The corrected profile is inversely converted into the profile of the reference color space.

20 Claims, 17 Drawing Sheets

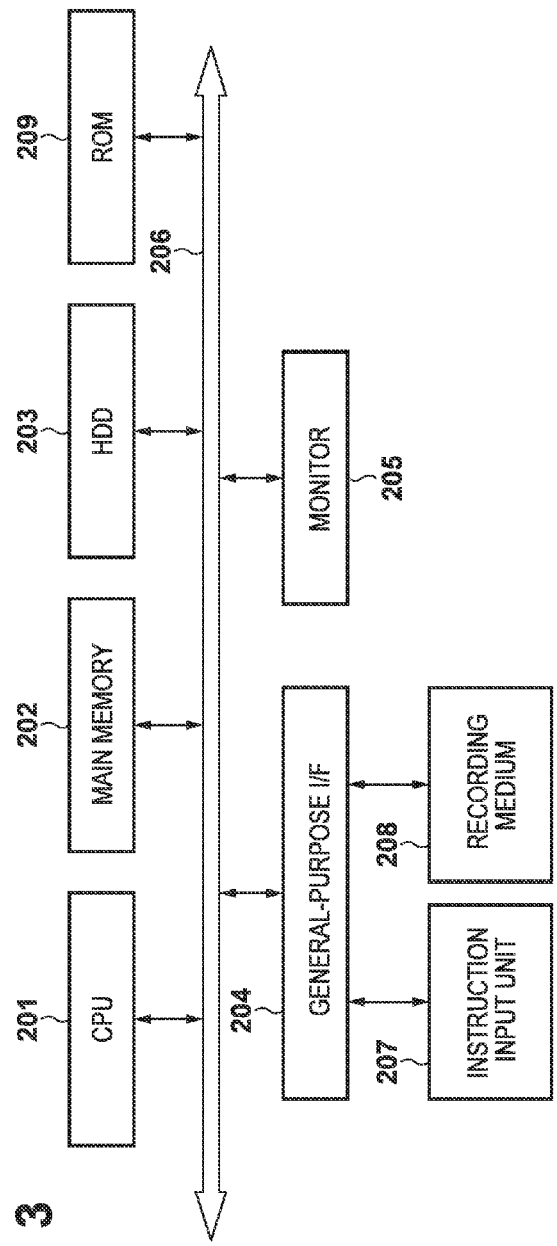
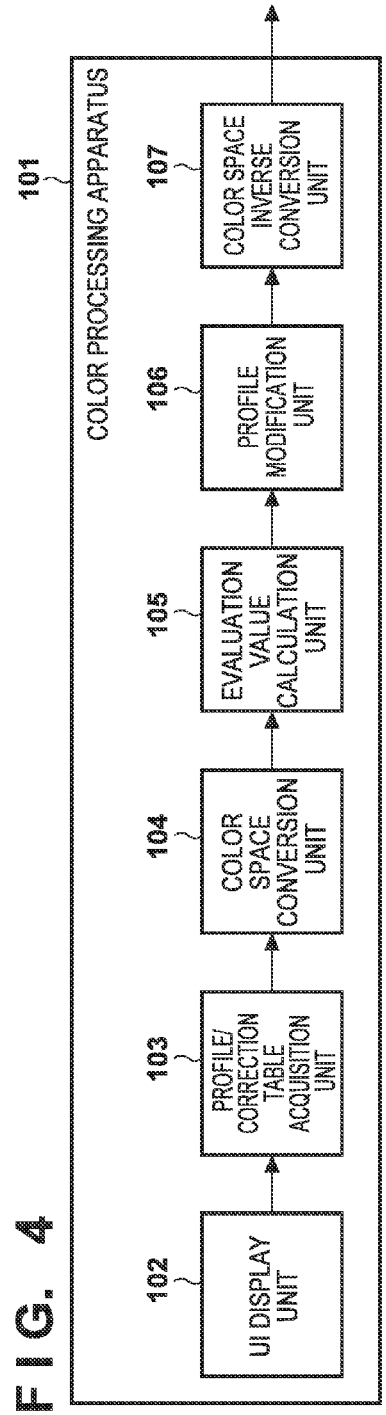

| REFERENCE COLOR SPACE | | | UNIFORM COLOR APPEARANCE SPACE | | |
|---|---|---|---|---|---|
| L* | a* | b* | L*' | a*' | b*' |
| 0 | -150 | -150 | XXX | XXX | XXX |
| 0 | -150 | -140.63 | XXX | XXX | XXX |
| 0 | -150 | -131.25 | XXX | XXX | XXX |
| ⋮ | ⋮ | ⋮ | ⋮ | ⋮ | ⋮ |
| 31.25 | 0 | 0 | XXX | XXX | XXX |
| 31.25 | 0 | 9.38 | XXX | XXX | XXX |
| ⋮ | ⋮ | ⋮ | ⋮ | ⋮ | ⋮ |
| 75 | 37.5 | 93.75 | XXX | XXX | XXX |
| 75 | 37.5 | 103.13 | XXX | XXX | XXX |
| ⋮ | ⋮ | ⋮ | ⋮ | ⋮ | ⋮ |
| 100 | 150 | 140.63 | XXX | XXX | XXX |
| 100 | 150 | 150 | XXX | XXX | XXX |

FIG. 11

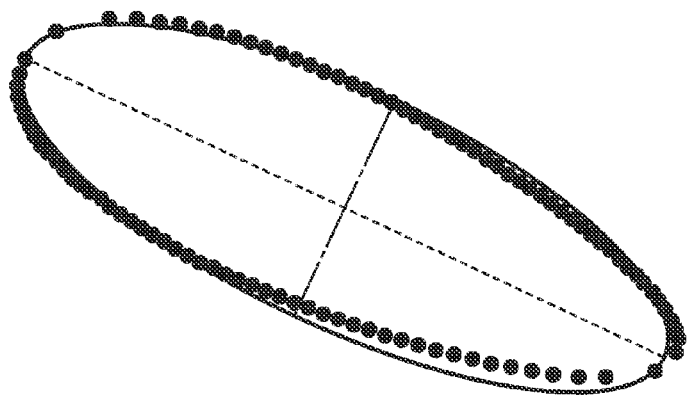

● : COLOR DISCRIMINATION THRESHOLD FOR GIVEN COLOR
───── : ELLIPSE OBTAINED BY APPROXIMATING COLOR DISCRIMINATION THRESHOLDS
-------- : MAJOR AXIS OF ELLIPSE
── ─ ── : MINOR AXIS OF ELLIPSE

FIG. 12

| ELLIPSE APPROXIMATION DATA | | COORDINATES (CIE TRISTIMULUS VALUES X, Y, AND Z) |
|---|---|---|
| ELLIPSE 1 | CENTER | (XXX, XXX, XXX) |
| | END POINT 1 OF MAJOR AXIS | (XXX, XXX, XXX) |
| | END POINT 2 OF MAJOR AXIS | (XXX, XXX, XXX) |
| | END POINT 1 OF MINOR AXIS | (XXX, XXX, XXX) |
| | END POINT 2 OF MINOR AXIS | (XXX, XXX, XXX) |
| ELLIPSE 2 | CENTER | (XXX, XXX, XXX) |
| | END POINT 1 OF MAJOR AXIS | (XXX, XXX, XXX) |
| | END POINT 2 OF MAJOR AXIS | (XXX, XXX, XXX) |
| | END POINT 1 OF MINOR AXIS | (XXX, XXX, XXX) |
| | END POINT 2 OF MINOR AXIS | (XXX, XXX, XXX) |
| ⋮ | ⋮ | ⋮ |
| | | (XXX, XXX, XXX) |

F I G. 13
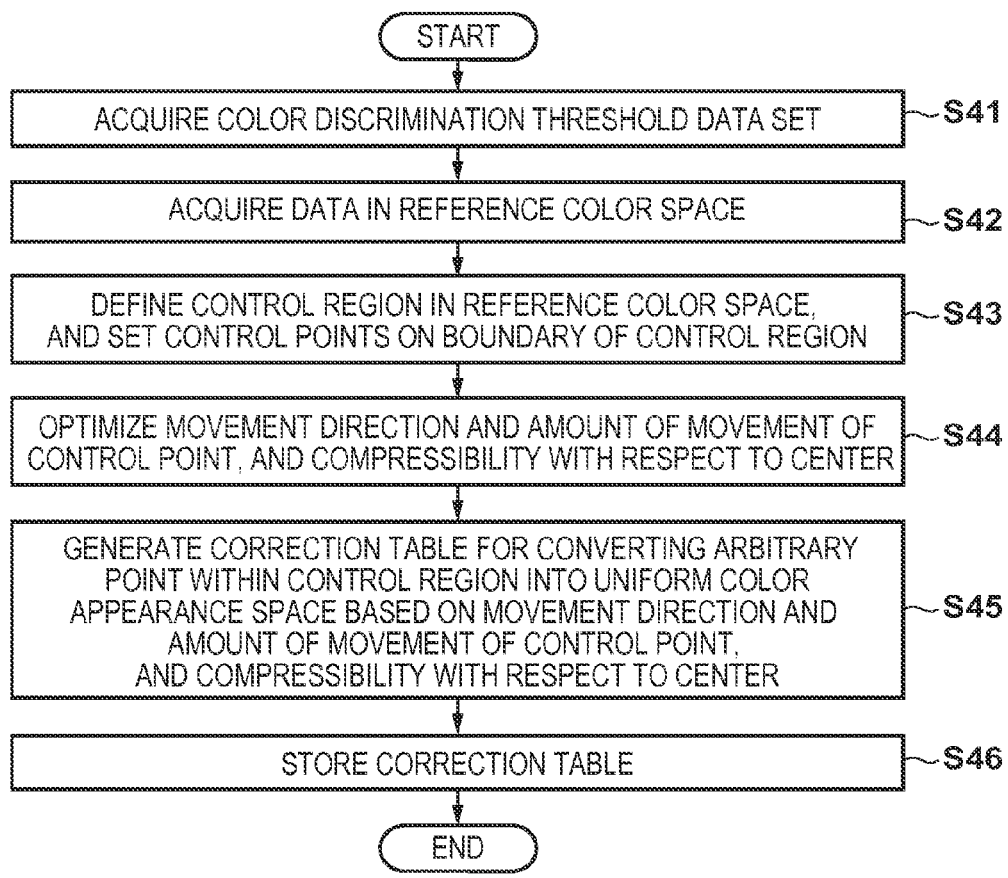

FIG. 17
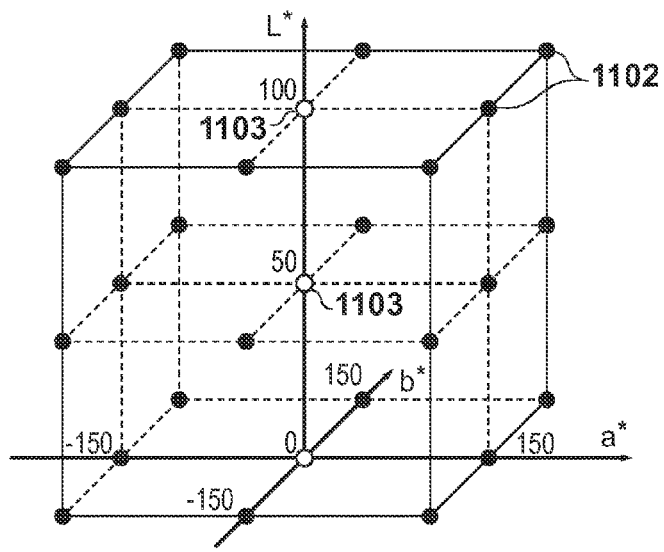
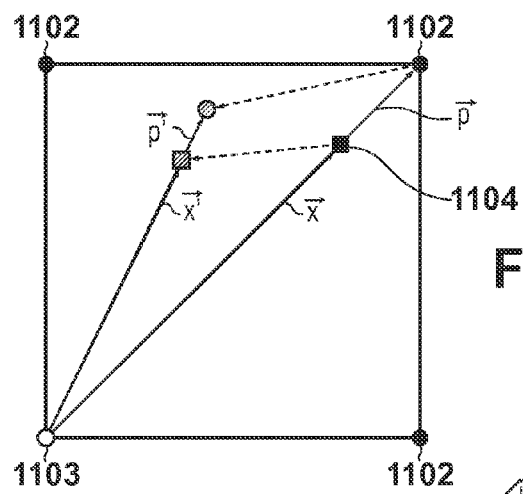
FIG. 18
FIG. 19
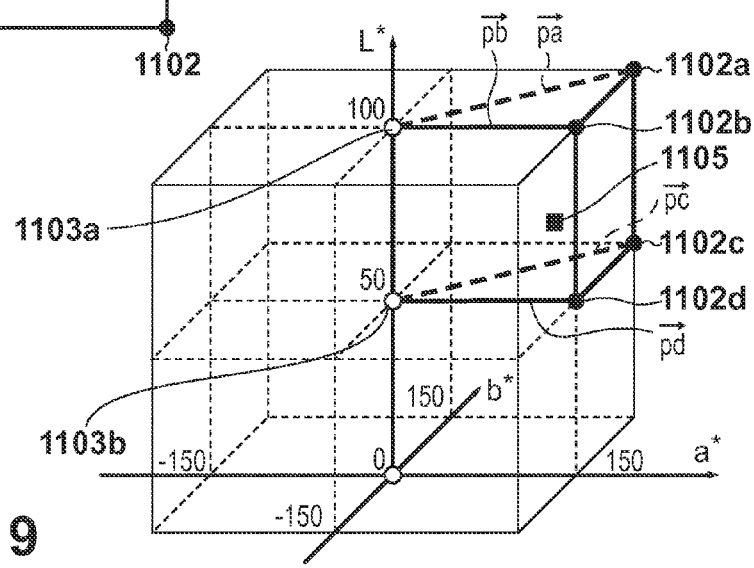

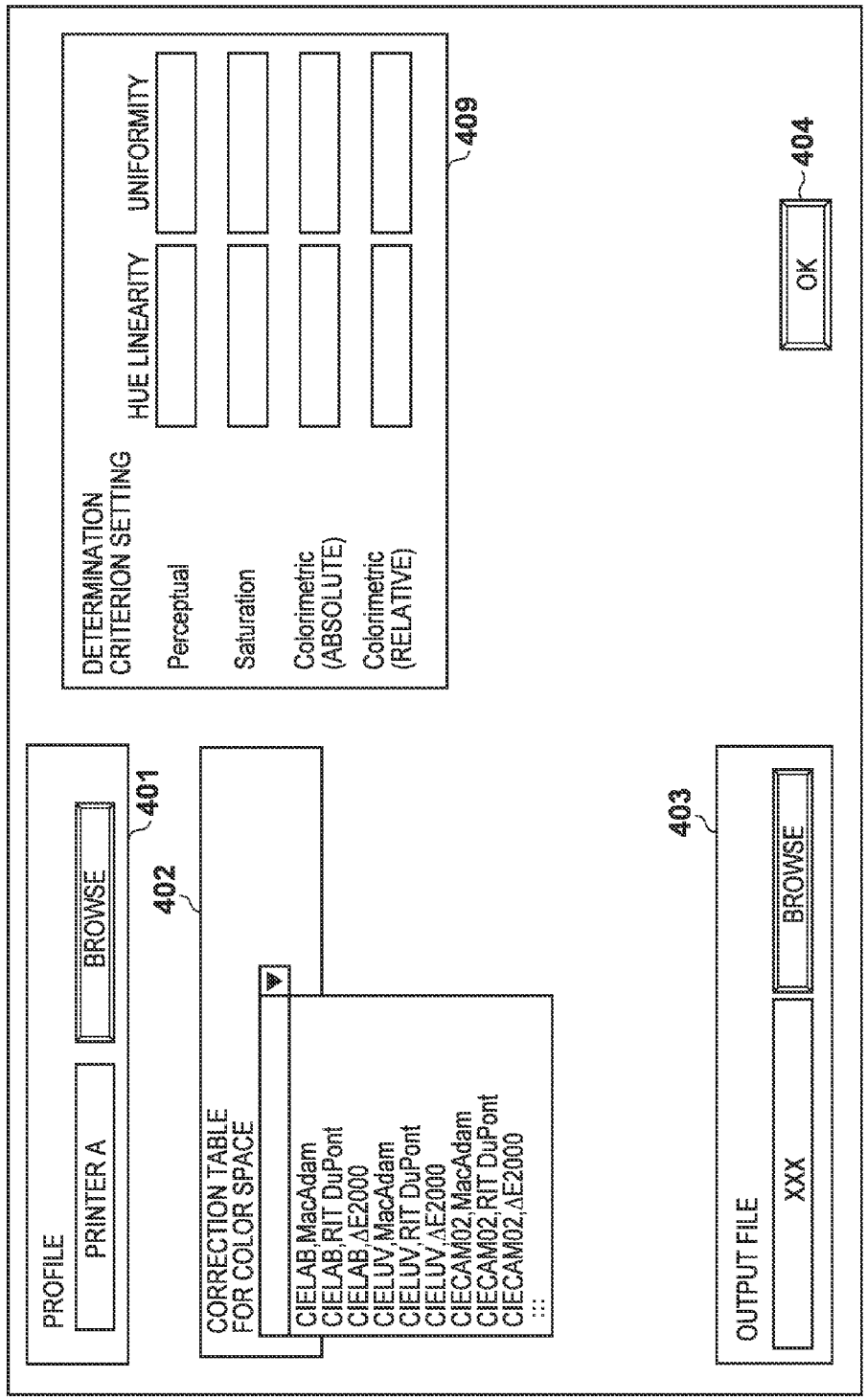

COLOR PROCESSING APPARATUS AND COLOR PROCESSING METHOD

This application is a continuation of U.S. patent application Ser. No. 13/671,406, filed Nov. 7, 2012, the contents of which are incorporated herein by reference.

BACKGROUND OF THE INVENTION

1. Field of the Invention

The present invention relates to a color processing apparatus and a color processing method and, more particularly, to a color processing apparatus and a color processing method for correcting a profile.

2. Description of the Related Art

To match colors between various image input and output apparatuses, a profile such as an International Color Consortium (ICC) profile is used. The profile includes an A2B tag with a lookup table (LUT) to convert a device-dependent signal value into a device-independent signal value, and a B2A tag with a LUT for converting a device-independent signal value into a device-dependent signal value. Note that examples of the device-dependent signal value are an RGB signal value and CMYK signal value. The device-independent signal value is a signal value (PCS value) in a profile connection space (PCS), for example, a CIELAB value.

To create the LUT of the A2B tag, a color chart including a plurality of patches for which signal values are known is displayed on a monitor, or printed by a printer, and the color value (for example, the CIELAB value) of each displayed or printed patch is measured, thereby acquiring a correspondence between the signal value and the color value (PCS value). With interpolation processing based on the acquired correspondence, the LUT of the A2B tag for converting a signal value into a PCS value is created for the whole range of the signal value. On the other hand, to create the LUT of the B2A tag, grid points are defined in the PCS, a signal value corresponding to the PCS value of each grid point is obtained by executing an interpolation operation.

Color conversion using the thus created profile enables to match colors between image input and output apparatuses. The color gamut of the image input apparatus is different from the range (to be referred to as a "color reproducible range" hereinafter) of color which can be reproduced by the image output apparatus, and the color reproducible range of the image output apparatus is usually smaller than the color gamut of the image input apparatus. Consequently, the image output apparatus cannot reproduce a color in a color gamut outside the color reproducible range. It is, therefore, necessary to map the color gamut of the image input apparatus into the color reproducible range of the image output apparatus. The color reproducible ranges of a monitor and printer both of which are image output apparatuses are different from each other, as a matter of course. Therefore, the color impression of an image displayed on the monitor is different from that of an image output from the printer, and the tonality of the printed image is lower than that of the displayed image.

To deal with these problems, there is proposed a method of improving the color reproduction accuracy of a profile. For example, the profile is used to output a color chart, and the amount of correction is determined based on the colorimetric value of each patch of the output color chart. Alternatively, the user visually evaluates the color chart to determine the amount of correction. The profile is then corrected based on the amount of correction.

The above method requires heavy labors for printing and measurement of the color chart, and thus it takes time to correct the profile. Furthermore, although visual evaluation eliminates the need for measurement, another problem arises. That is, the profile is corrected in the same color space as that in which the profile has been designed, for example, a standard color space such as a CIELAB color space, but the standard color space is not a uniform color space for human appearance (to be referred to as a "non-uniform color appearance space"). Correction intended by the user, therefore, may not be reflected on a result, and thus an appropriate profile cannot be always obtained by one correction operation.

FIG. 1 is a graph obtained by plotting color discrimination thresholds (see literature 1) for 25 colors created by MacAdam in the CIELAB space. Note that FIG. 1 is a graph obtained by magnifying the color discrimination thresholds (to be referred to as "MacAdam ellipses" hereinafter) by 10 times, and plotting only chromaticity information on an a*b* plane for descriptive convenience.

Literature 1: D. L. MacAdam "Visual sensitivities to color differences in daylight" Journal of the Optical Society of America, Vol. 32, No. 5, pp. 247 to 274, in May, 1942

Each ellipse shown in FIG. 1 indicates a range where a human recognizes color as the same one. The area of an ellipse for color with low chroma is relatively small, and the area of an ellipse for color with high chroma, especially for blue or green, is very large. That is, a human can discriminate colors with low chroma even though a distance within the color space is short. For blue or green with high chroma, however, it is difficult to discriminate colors even though a distance within the color space is long.

FIG. 2 shows a case in which a profile has been designed so that a chroma value C* is plotted at a regular interval in a non-uniform color appearance space. In a low chroma range, there is a big difference between the chroma appearances of colors (patches), and it is possible to identify the different colors (patches). In a high chroma range, however, there is a small difference between the chroma appearances of colors (patches), and it is difficult to identify the different colors (patches). It is, therefore, very difficult to correct the profile in the non-uniform color appearance space.

SUMMARY OF THE INVENTION

In one aspect, a color processing apparatus comprising: an acquisition section configured to acquire a profile of a reference color space; a converter configured to convert the acquired profile into a profile of a uniform color appearance space which is a color space different from the reference color space; a calculator configured to calculate an evaluation value of color in the profile of the uniform color appearance space; a modifier configured to correct the profile of the uniform color appearance space based on the calculated evaluation value; and an inverse converter configured to inversely convert the corrected profile into the profile of the reference color space.

In another aspect, a color processing method comprising: acquiring a profile of a reference color space; converting the acquired profile into a profile of a uniform color appearance space which is a color space different from the reference color space; calculating an evaluation value of color in the profile of the uniform color appearance space; correcting the profile of the uniform color appearance space based on the calculated evaluation value; and inversely converting the corrected profile into the profile of the reference color space.

According to these aspects, it is possible to appropriately and immediately correct a profile in a reference color space.

In other aspect, a method of generating a profile comprising: acquiring a profile of a reference color space; converting the acquired profile into a profile of a uniform color appearance space which is a color space different from the reference color space; calculating an evaluation value of color in the profile of the uniform color appearance space; and generating a profile by correcting the profile of the uniform color appearance space based on the calculated evaluation value, and inversely converting the corrected profile into the profile of the reference color space.

According to the aspect, it is possible to generate an appropriate profile in a reference color space.

Further features of the present invention will become apparent from the following description of exemplary embodiments with reference to the attached drawings.

BRIEF DESCRIPTION OF THE DRAWINGS

FIG. 3 is a block diagram showing the arrangement of a color processing apparatus according to an embodiment.

FIG. 4 is a block diagram for explaining the logical configuration of the color processing apparatus according to the first embodiment.

FIG. 11 is a view for explaining an example of ellipse approximation for color discrimination threshold data.

FIG. 12 is a table for explaining an example of the format of a color discrimination threshold data set.

FIG. 13 is a flowchart for explaining the concept of a correction table creation method.

FIG. 17 is a graph for explaining the relationship between a control point and a center.

FIG. 18 is a view for explaining movement of an intermediate point.

FIG. 19 is a graph for explaining mapping of a color discrimination threshold data set.

FIG. 24 is a view showing another example of the UI provided by the UI display unit.

DESCRIPTION OF THE EMBODIMENTS

Figure 1:
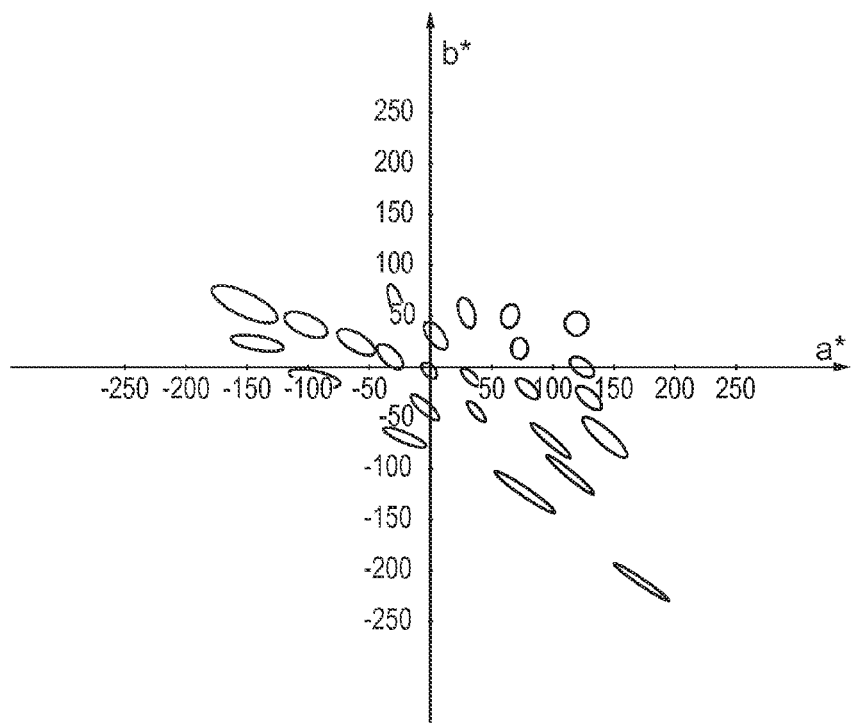
FIG. 1 is a graph obtained by plotting color discrimination thresholds for 25 colors created by MacAdam in a CIELAB space.
Figure 2:
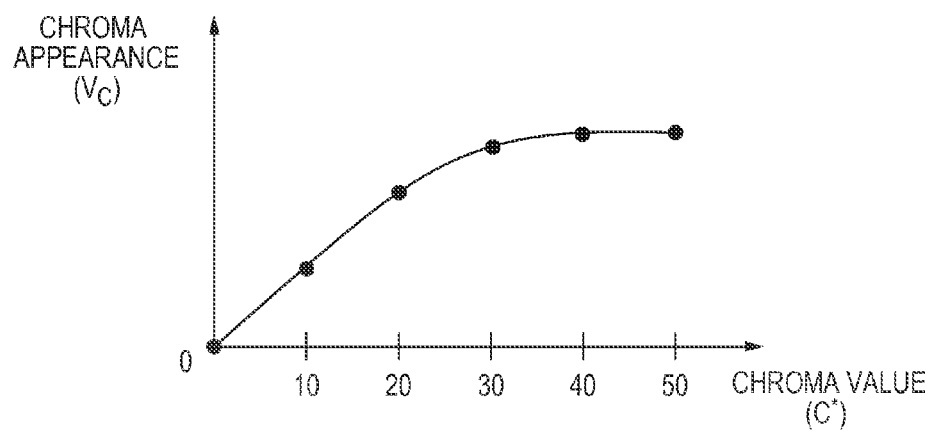
FIG. 2 is a graph showing a case in which a profile has been designed so that a chroma values C* is plotted at a regular interval in a non-uniform color appearance space.

A color processing apparatus and a color processing method according to embodiments of the present invention will be described in detail below with reference to the accompanying drawings.

First Embodiment

Arrangement of Apparatus

FIG. 3 is a block diagram showing the arrangement of an information processing apparatus serving as a color processing apparatus according to the embodiment.

A microprocessor (CPU) 201 uses a main memory 202 such as a random access memory (RAM) as a work memory to execute a program stored in a read only memory (ROM) 209 or a hard disk drive (HDD) 203, thereby controlling the arrangement (to be described later) through a system bus 206. Note that a program for implementing color processing (to be described later) and various data are stored in the ROM 209 or HDD 203.

An instruction input unit 207 such as a keyboard and mouse, and a recording medium 208 such as a USB (Universal Serial Bus) memory and memory card are connected with a general-purpose interface (I/F) 204 such as a USB or IEEE1394 interface. The CPU 201 displays, on a monitor 205, a user interface (UI), processing progress, or information indicating a processing result.

For example, in response to a user instruction input through the instruction input unit 207, the CPU 201 loads an application program (AP) stored in the ROM 209, HDD 203, or recording medium 208 into a predetermined area of the main memory 202. The CPU 201 then executes the AP, and displays the UI on the monitor 205 according to the AP.

Next, in response to a user operation for the UI, the CPU 201 loads various data stored in the HDD 203 or recording medium 208 into a predetermined area of the main memory 202. According to the AP, the CPU 201 executes predetermined arithmetic processing for the various data loaded into the main memory 202. In response to a user operation for the UI, the CPU 201 then displays an arithmetic processing result on the monitor 205, or stores it in the HDD 203 or recording medium 208.

Note that the CPU 201 can also transmit/receive the program, data, and arithmetic processing result to/from a server apparatus on a network through a network I/F (not shown) connected with the system bus 206.

[Logical Configuration]

FIG. 4 is a block diagram for explaining the logical configuration of a color processing apparatus 101 according to the first embodiment. Note that the configuration shown in FIG. 4 is implemented when the CPU 201 executes an AP.

In the color processing apparatus 101, a UI display unit 102 displays a UI on the monitor 205. A profile/correction table acquisition unit 103 acquires a profile to be corrected and a correction table (to be described later) from the HDD 203 or recording medium 208 in response to a user instruction input through the UI. That is, the profile to be corrected is an existing profile stored in the HDD 203 or recording medium 208. A color space conversion unit 104 converts the existing profile into the profile of a uniform color appearance space which has been made uniform for human appearance as much as possible by improving the uniformity of appearance of a design color space (for example, a CIELAB space, CIELUV space, or the like).

An evaluation value calculation unit 105 calculates the evaluation values of the hue linearity and gradation uniformity of the converted profile of the uniform color appearance space. To improve the hue linearity and gradation uniformity of the converted profile of the uniform color appearance space, a profile modification unit 106 modifies values set for the grid points of the converted profile of the uniform color appearance space.

A color space inverse conversion unit 107 executes inverse conversion of the color space conversion unit 104 to inversely convert the modified values of the profile in the uniform color appearance space into values in the original color space (design color space), and outputs the profile having undergone inverse conversion to the HDD 203 or recording medium 208. That is, the color space inverse conversion unit 107 converts the corrected profile into a profile in the same format as that of the existing profile. In other words, the profile modification unit 106 and the color space inverse conversion unit 107 function as a generator of a profile.

UI Display Unit

Figures 5, 6:
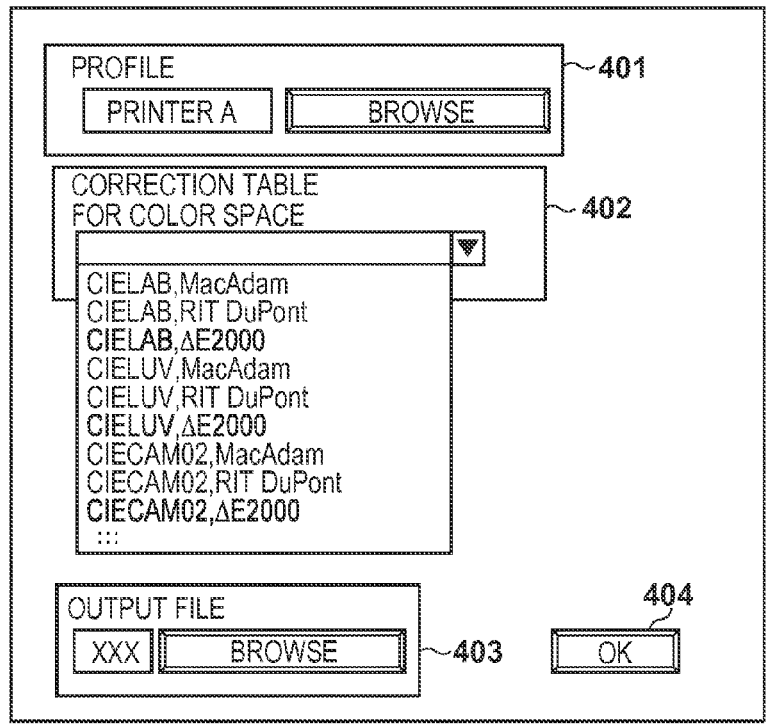
FIG. 5 is a view showing an example of a UI provided by a UI display unit.
FIG. 6 is a table showing an example of a correction table.

FIG. 5 shows an example of the UI provided by the UI display unit 102.

The user operates an instruction input unit 401 to input or select, for example, the name of the profile to be corrected, which is stored in the HDD 203 or recording medium 208. The user also operates an instruction input unit 402 to input an instruction to select a correction table or compensation table to be used to correct or compensate the uniformity of appearance of a color space.

A correction table is created in advance for each pair of a reference color space and a color discrimination threshold data set, and stored in the HDD 203 or recording medium 208. The correction table includes a table for correcting the CIELAB space based on the MacAdam data set, and a table for correcting the CIELUV space based on a ΔE2000 data set. Note that a correction table creation method will be described later.

In addition to the MacAdam ellipse data set, various color discrimination threshold data have been proposed. Examples of the data are an RIT DuPont data set (literature 2), a BFDP data set (literature 3), and a Brown data set (literature 4), which may be used to create the above-described correction table. It is also possible to create a color discrimination threshold data set by executing inverse calculation based on the ΔE94 or ΔE2000 color difference formula defined by the CIE, and use it. For an arbitrary point, for example, it is possible to create a color discrimination threshold data set by circumferentially searching for a point where the value of ΔE94 or ΔE2000 becomes 1 using the point as a center. Instead of an already presented data set or the data set derived from a color difference formula, a data set which has been proprietarily created by performing a color matching experiment may be used.

Literature 2: Melgosa M, Hita E, Poza A J, Alman D H, and Berns R S "Suprathreshold color-difference ellipsoids for surface colours" Color Res. Appl. 22, pp. 148 to 155, 1997

Literature 3: M. R. Luo and B. Rigg "Chromaticity-Discrimination Ellipses for Surface Colours" Color Res. Appl. 11, pp. 25 to 42, 1986

Literature 4: W. R. J. Brown "Color Discrimination of Twelve Observers" J. Opt. Soc. Am. 47, pp. 137 to 143, 1957

The correction table is a table for correcting a color space so that color discrimination threshold data plotted in the color space become circles with the same size, and is used to make the color space uniform for human appearance as much as possible. FIG. 6 shows an example of the correction table. As shown in FIG. 6, the correction table stores a correspondence between a reference color space and a uniform color appearance space. The value of an arbitrary point within the reference color space can be converted into a value in the uniform color appearance space using an interpolation operation based on the data of the correction table.

When selecting a correction table, a reference color space needs to coincide with the PCS of the profile to be corrected, which is instructed by the user. FIG. 5 shows combinations of a plurality of reference color spaces and a plurality of color discrimination threshold data sets. It is possible to select a correction table from combinations of the PCS serving as the design color space of the profile to be corrected and the plurality of color discrimination threshold data sets. Note that in the following description, the PCS is the CIELAB space and a color value set for each grid point is a CIELAB value.

The user operates an instruction input unit 403 to input or select the file name of the corrected profile. When the user presses an "OK" button 404, the CPU 201 starts processing of correcting the profile according to the user instruction.

Note that the UI shown in FIG. 5 is merely an example. Any UI can be used as long as the UI enables to designate a profile to be corrected, a correction table, and an output file name.

[Profile Correction Processing]

Figure 7A:
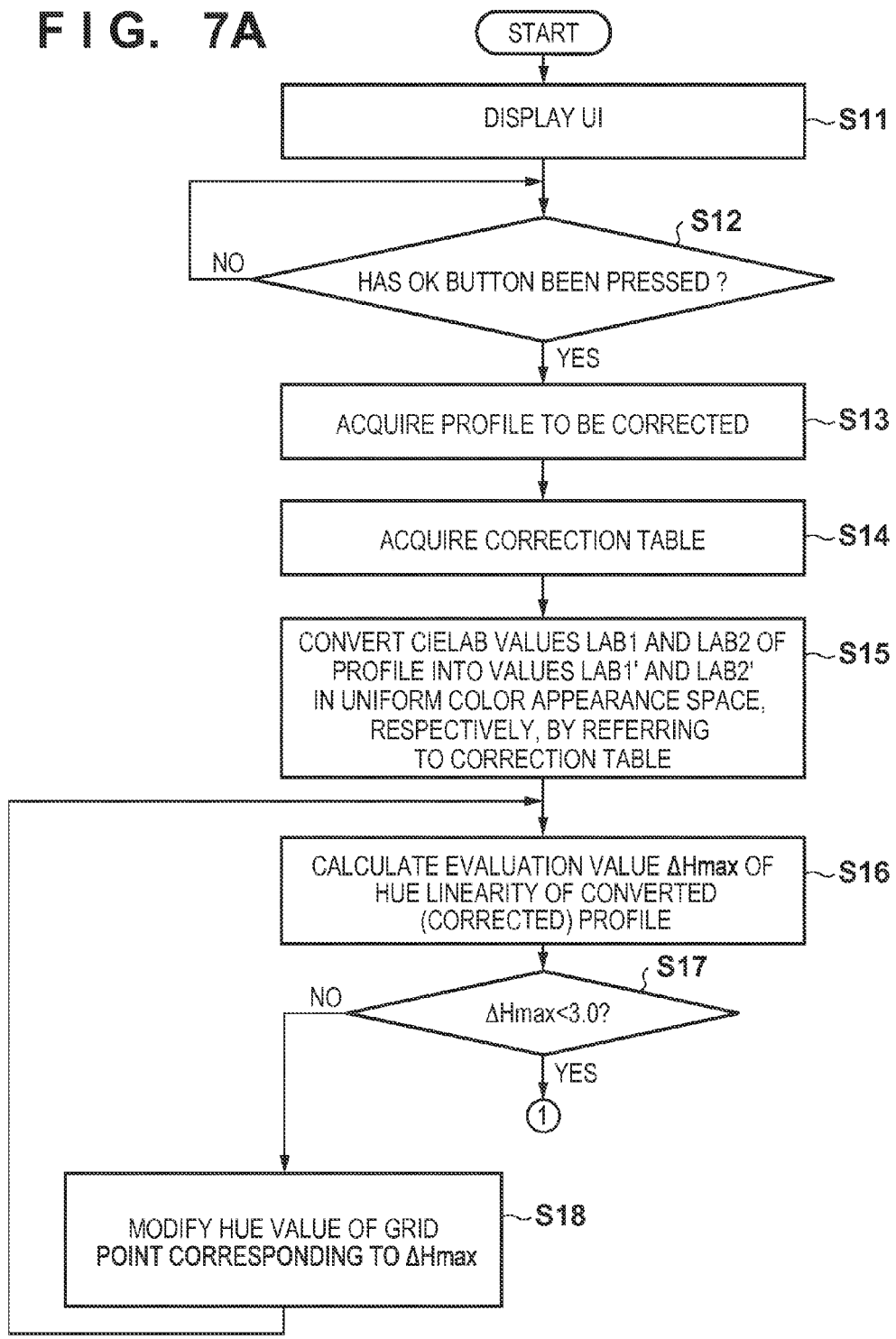
FIGS. 7A and 7B are flowcharts for explaining profile correction processing.
Figure 7B:
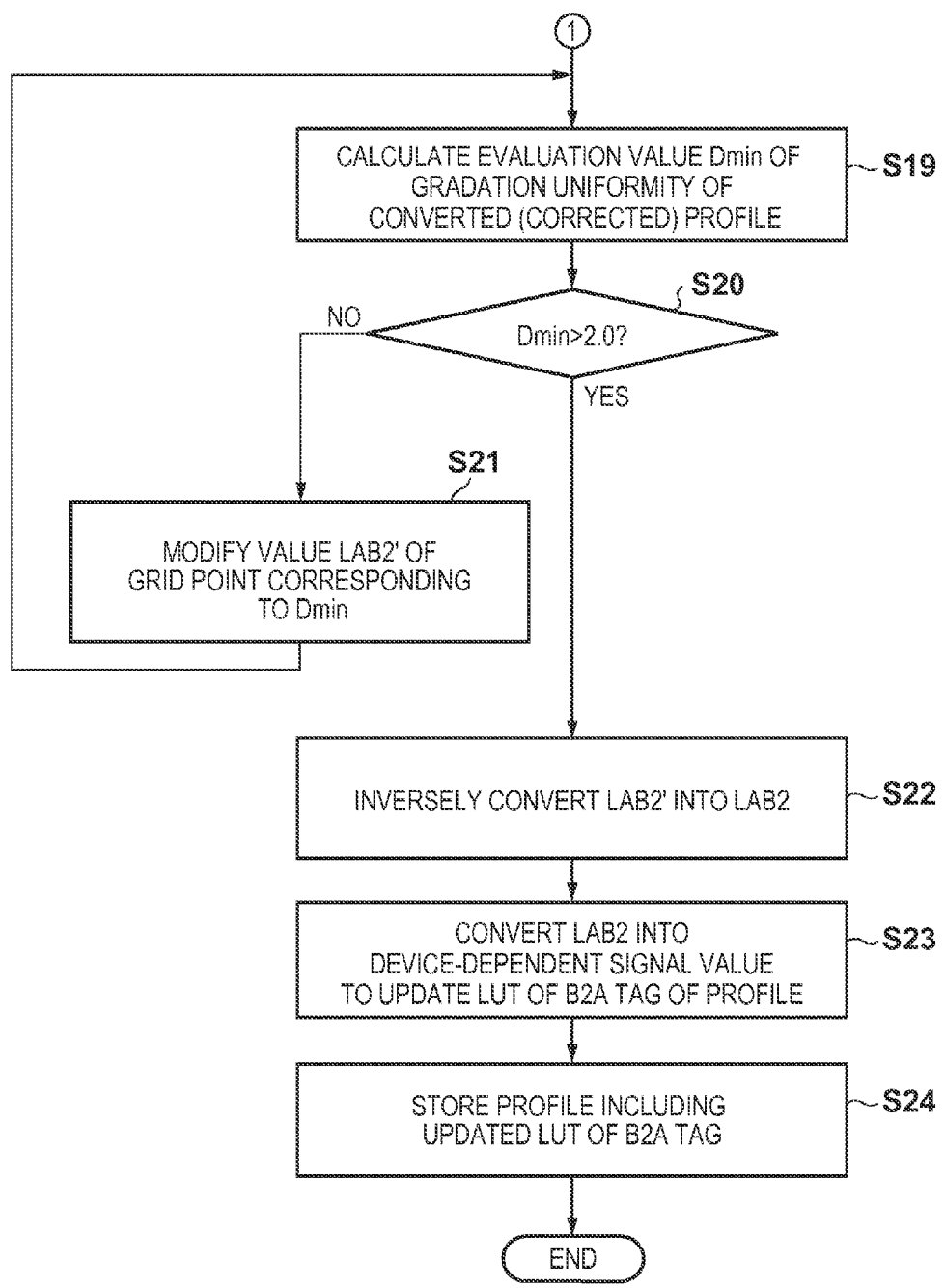

FIGS. 7A and 7B are flowcharts for explaining profile correction processing.

When execution of profile correction processing is instructed through the instruction input unit 207, the CPU 201 displays the UI exemplified in FIG. 5 on the monitor 205 (S11). When the "OK" button 404 is pressed (S12), the CPU 201 acquires a profile to be corrected (S13), and acquires a correction table (S14) according to the user instruction.

The CPU 201 refers to the acquired correction table to convert a CIELAB value in the acquired profile into a LAB value in the uniform color appearance space (S15). That is, the CPU 201 converts, into a value LAB1' in the uniform color appearance space, the CIELAB value (LAB1) of a grid point of the LUT (first table) of a B2A tag representing conversion from a CIELAB value into a device-dependent signal value. Furthermore, the CPU 201 converts the CIELAB value (LAB2) obtained by converting a device-dependent signal value set for a grid point of the first table into a value LAB2' in the uniform color appearance space using the LUT (second table) of an A2B tag representing conversion from a device-dependent signal value into a CIELAB value. That is, the color values LAB1 and LAB2 for the same grid point are converted into the first color value LAB1' and the second color value LAB2' in the uniform color appearance space, respectively, by performing an interpolation operation referring to the correction table.

The CPU 201 calculates the evaluation value of the hue linearity of the converted profile of the uniform color appearance space (S16). A hue value H1 of the color value LAB1' and a hue value H2 of the color value LAB2' for each grid point are calculated according to equation (1), and a difference ΔH=H1−H2 is calculated, thereby setting a maximum value ΔHmax of an absolute difference |ΔH| as the evaluation value of the hue linearity.

$$H = \tan^{-1}(b/a) \quad (1)$$

The CPU 201 determines whether the evaluation value ΔHmax of the hue linearity is smaller than a threshold (S17). Note that since the embodiment has as its object to faithfully reproduce the color appearance between the image input and output apparatuses, it is important that the hues match each other. If hue values in the uniform color appearance space are equal to each other, the hue appearances are also equal to each other. To achieve this, ΔH=0 is desirable. However, for example, ΔHmax<3.0 is set as the determination criterion.

Figure 8:
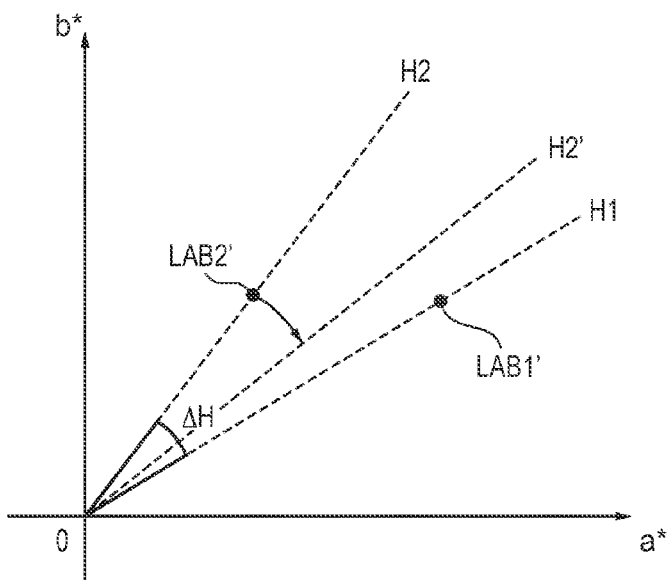
FIG. 8 is a graph for explaining the concept of modification of a hue value.

If the evaluation ΔHmax of the hue linearity does not satisfy the criterion, the CPU 201 modifies the hue value of a grid point corresponding to ΔHmax according to equation (2) (S18). FIG. 8 is a graph for explaining the concept of modification of a hue value. Note that values other than the LAB value of a grid point of interest are omitted in FIG. 8 for descriptive convenience.

That is, the CPU 201 calculates a modification value H2' by multiplying a hue difference ΔH of a grid point of interest by a coefficient k, and adding a multiplication result to a hue value H2. If coefficient k=1, the hue values of the profiles before and after conversion can be equal to each other. The continuity of the hue with grid points around the grid point of interest, however, may decrease. On the other hand, if k=0, the hue is not modified. The coefficient falls within the range of 0<k<1, and is set depending on whether modification of a hue difference or the continuity of the hue with the surrounding grid points has priority (depending on the amount of correction).

$$H2'=H2+\Delta H \times k \quad (2)$$

Note that the brightness and chroma are not changed in modification of the hue linearity (S18). As shown in FIG. 8, modification is performed in a direction in which a difference in hue appearance becomes small (the hue of LAB2' comes close to that of LAB1') by modifying the hue value of LAB2'. After modifying the hue, the CPU 201 returns the process to step S16 to repeat the processing in steps S16 to S18 until the evaluation value ΔHmax of the hue linearity after modification of the hue becomes smaller than the threshold.

If the evaluation value ΔHmax of the hue linearity is smaller than the threshold, the CPU 201 calculates the evaluation value of the gradation uniformity of the profile after conversion or after modification of the hue (S19). A distance D between LAB2' of the grid point of interest and LAB2' of an adjacent grid point is calculated according to, for example, equation (3), thereby setting a minimum value Dmin of the distance D as the evaluation value of the gradation uniformity.

$$D=\sqrt{\{(L_i-L_n)^2+(a_i-a_n)^2+(b_i-b_n)^2\}} \quad (3)$$

where $L_i a_i b_i$ represents LAB2' of the grid point of interest, and
$L_n a_n b_n$ represents LAB2' of an adjacent grid point.

If the distance D between the values LAB2' of adjacent grid points is too small, the tonality degrades. The evaluation value of the gradation uniformity is desirably set to be equal to or larger than the threshold, for which the tonality does not degrade. In the uniform color appearance space, it is possible to comprehensively evaluate degradation in tonality since perceptions of differences in distance and color appearance can be equally dealt with for the whole region.

The CPU 201 determines whether the evaluation value Dmin of the gradation uniformity is larger than a threshold (S20). For example, Dmin>2.0 is set as the determination criterion.

If the evaluation value Dmin of the gradation uniformity is not larger than the threshold, the CPU 201 modifies the value LAB2' of a grid point corresponding to Dmin (S21), and details thereof will be described later. The process then returns to step S19 to repeat the processing in steps S19 to S21 until the evaluation value Dmin of the gradation uniformity after modification of LAB2' becomes larger than the threshold.

If the evaluation value Dmin of the gradation uniformity is larger than the threshold, the CPU 201 refers to the correction table to inversely convert the modified second color value LAB2' into a third color value LAB2 (S22). The CPU 201 refers to the LUT (first table) of the B2A tag of the profile to convert the third color value LAB2 into a device-dependent signal value, thereby updating the LUT (first table) of the B2A tag of the profile with the third color value LAB2 and the device-dependent signal value (S23). The CPU 201 stores, in the HDD 203 or recording medium 208, the profile with the updated LUT (first table) of the B2A tag as a profile with a file name according to the user instruction (S24).

Modification of Gradation Uniformity (Step S21)

Figure 9A:
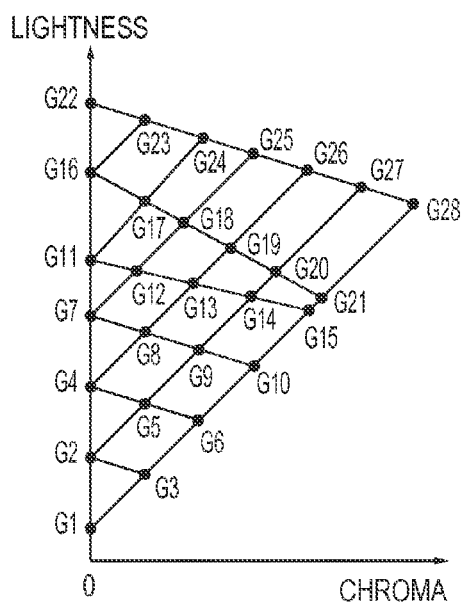
FIGS. 9A and 9B are graphs for explaining processing of modifying a value LAB2' of a grid point adjacent to a grip point corresponding to an evaluation value Dmin of the gradation uniformity to prevent occurrence of tone burning-out.
Figure 9B:
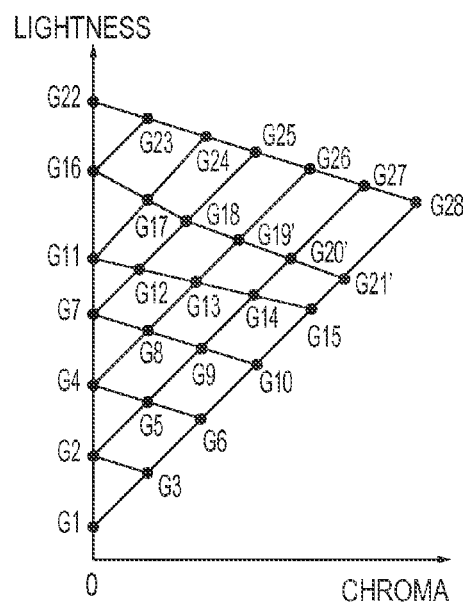

FIGS. 9A and 9B are graphs for explaining processing of modifying the value LAB2' of a grid point adjacent to a grip point corresponding to the evaluation value Dmin of the gradation uniformity to prevent degradation in tonality. Note that FIG. 9A shows the LC value of the grid point before the modification and FIG. 9B shows the LC value of the grid point after the modification.

Figure 10:
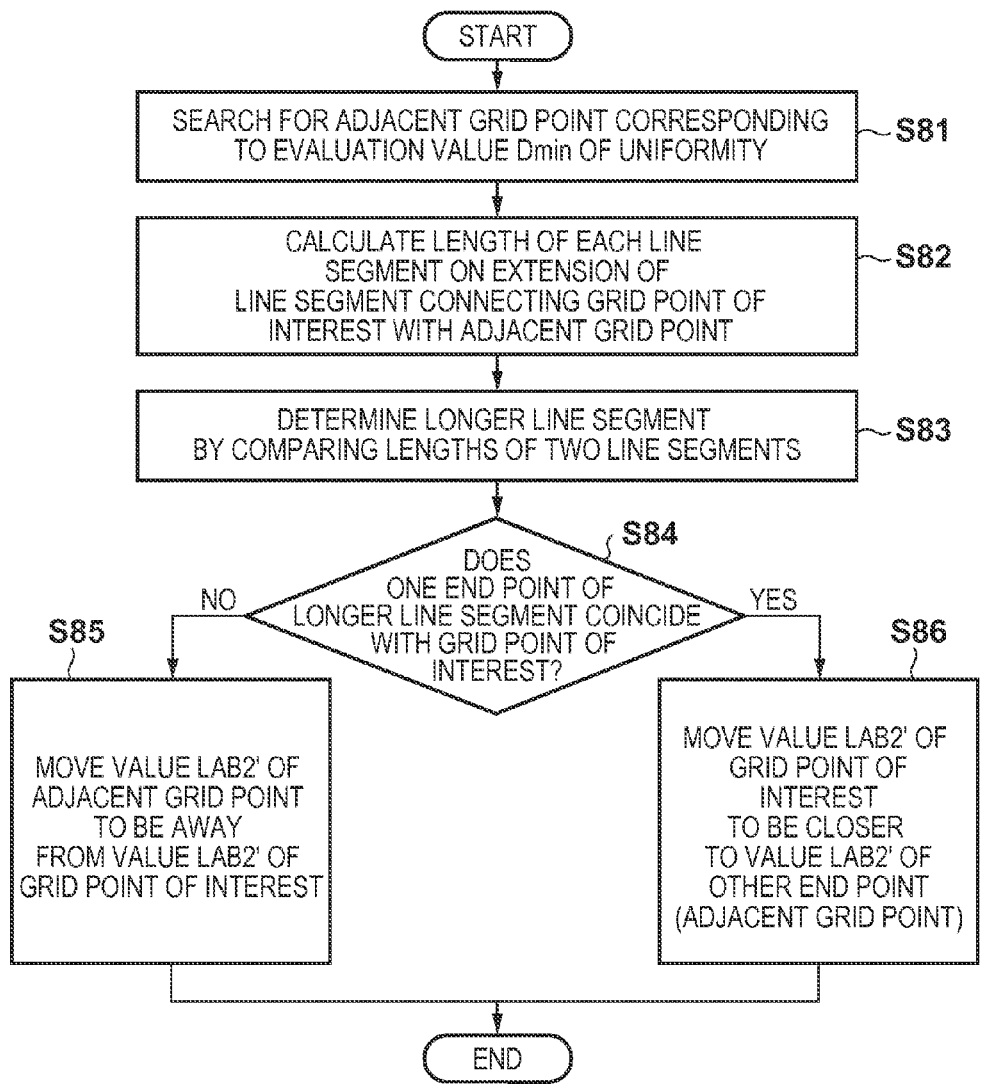
FIG. 10 is a flowchart for explaining the processing of modifying the gradation uniformity.

FIG. 10 is a flowchart for explaining the processing of modifying the gradation uniformity.

The CPU 201 searches for an adjacent grid point corresponding to the evaluation value Dmin of the gradation uniformity (S81). Referring to FIG. 9A, G15 represents a grid point of interest, and G21 represents an adjacent grid point corresponding to the evaluation value Dmin. The CPU 201 calculates the distance between values LAB2' (to be referred to as the "length of a line segment") on a line segment G10-G15 or G21-G28 which is on the extension of a line segment G15-G21 connecting the grid point of interest with the adjacent grid point (S82). Note that if the grid point of interest or the adjacent grid point is on the border of the LUT, and there is a line segment on only one side of the extension direction, the length of the line segment is calculated.

The CPU 201 determines a longer one of the two line segments by comparing them (S83). In the example shown in FIG. 9A, the line segment G21-G28 is determined as a longer one. Note that if there is a line segment on only one side of the extension direction, this determination operation is not executed.

The CPU 201 determines whether one end point of the line segment determined as a longer one coincides with the grid point of interest (S84). If the end point of the longer line segment does not coincide with the grid point of interest, the CPU 201 moves the value LAB2' of the grid point adjacent to the grid point of interest to be away from the value LAB2' of the grid point of interest (S85). In the example of FIG. 9A, for example, the CPU 201 moves the value LAB2' of the adjacent grid point G21 to be away from the value LAB2' of the grid point of interest, that is, to be closer to the value LAB2' of the grid point G28.

If the line segment G10-G15 is longer, the grid point of interest coincides with an end point of the line segment. In this case, the CPU 201 moves the value LAB2' of the grid point of interest to be closer to the value LAB2' of the other end point (adjacent grid point) (S86). In FIG. 9A, for example, if the line segment G10-G15 is longer, the CPU 201 moves the value LAB2' of the grid point of interest G15 to be closer to the value LAB2' of the adjacent grid point G10.

The value LAB2' is desirably moved so that the length of the line segment G15-G21 satisfies the determination criterion (for example, the length is longer than 2.0). If moving the value LAB2' so as to satisfy the determination criterion causes the line segment G15-G21 to cross the grid point G28, the amount of movement is made smaller so as not to perform modification which causes the line segment to cross the grid point. In modification of the gradation uniformity, at least one of the brightness and chroma is changed without changing the hue value since it has already been modified to improve the hue linearity.

In FIG. 9B, G19', G20', and G21' respectively represent grid points for which the value LAB2' has been modified. That is, by repeating the gradation uniformity modification processing shown in FIG. 10 based on the determination in step S20, the LC values of the grid points shown in FIG. 9A are modified to those of the grid points shown in FIG. 9B. Note that although modification on the LC plane has been described above for descriptive convenience, modification of the gradation uniformity is performed in the LAB space instead of the LC plane.

[Generation of Correction Table]

In this embodiment, a color discrimination threshold data set which has undergone ellipse approximation in advance is stored in the HDD 203 or recording medium 208. FIG. 11 is a view for explaining an example of ellipse approximation for color discrimination threshold data. FIG. 12 is a table for explaining an example of the format of the color discrimination threshold data set. As shown in FIGS. 11 and 12, one set (to be referred to as "ellipse approximation data" hereinafter) includes data of five points in, for example, the CIEXYZ space, that is, the coordinates of the center of an ellipse, and the coordinates of four points (to be referred to as "end points" hereinafter) where the ellipse intersects the major axis and the minor axis. A data set obtained by preparing ellipse approximation data for each of a plurality of color regions is a color discrimination threshold data set.

FIG. 13 is a flowchart for explaining the concept of a correction table generation method.

The CPU 201 acquires a color discrimination threshold data set corresponding to a combination for generating a correction table from the HDD 203 or recording medium 208 (S41), and acquires data in the reference color space (S42). Note that subsequent processing will be described by assuming that data in the CIELAB space is acquired as data in the reference color space.

Figure 14:
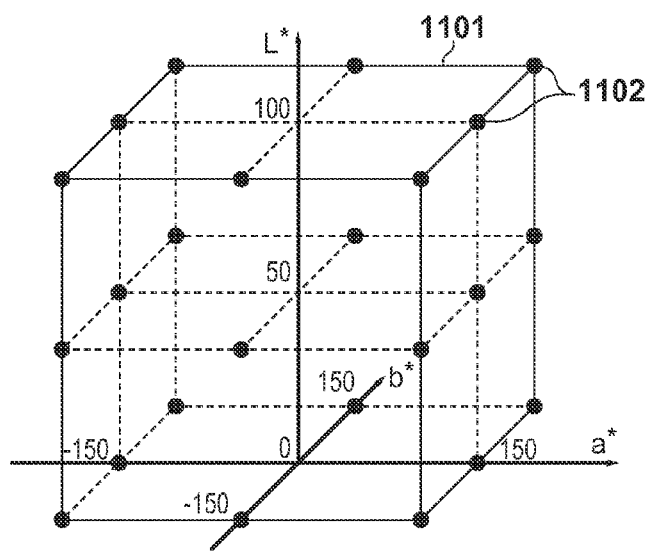
FIG. 14 is a graph showing an example of setting of a control region and control points.

The CPU 201 defines a control region in the CIELAB space as the reference color space, and sets control points on the boundary of the control region (S43). FIG. 14 is a graph showing an example of setting of the control region and control points. A control region 1101 is a region to be converted into the uniform color appearance space, and data outside the control region 1101 cannot be converted into data in the uniform color appearance space. The control region 1101 is, therefore, preferably wide enough, and for example, $0 \leq L^* \leq 100$, $-150 \leq a^* \leq 150$, and $-150 \leq b^* \leq 150$ are defined for the control region. A plurality of control points are set on the boundary of the control region. For example, as shown in FIG. 14, eight points are set for each brightness $L^*=0$, 50, or 100, which results in 24 points in total. The ab coordinate values of the 24 points are $(a^*, b^*)=(150, 0)$, (150, 150), (0, 150), (-150, 150), (-150, 0), (-150, -150), (0, -150), (150, -150).

After that, the CPU 201 optimizes the reference color space so that an ellipse representing ellipse approximation data approximates to a perfect circle by optimizing control parameters (the movement direction and the amount of movement of a control point, and the compressibility with respect to the center) (S44), and details thereof will be described later.

Based on the optimized control parameters, the CPU 201 generate a correction table (FIG. 6) for converting an arbitrary point within the control region into the uniform color appearance space (S45). For example, the CPU 201 slices each of the ranges of $L^*$, $a^*$, and $b^*$ of the control region into 33 ranges to create a grid including the control region of the reference color space, and describes, for each grid point, a color space value in the uniform color appearance space as a conversion destination. The CPU 201 then converts the color space value of each grid point (a detailed description thereof will be provided later), thereby generating a correction table representing a correspondence between a color space value in the reference color space and that in the uniform color appearance space.

The CPU 201 stores data added with an appropriate file name in the generated correction table in the HDD 203 or recording medium 208 (S46).

Optimization (Step S44)

Figures 15A, 15B:
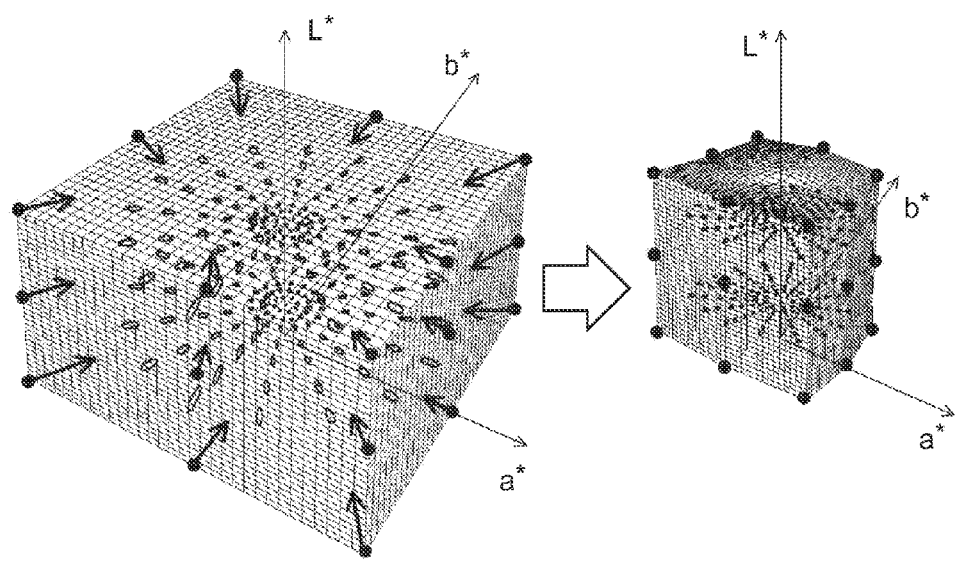
FIGS. 15A and 15B are schematic views for explaining a case in which an ellipse representing ellipse approximation data is approximated to a perfect circle by optimizing control parameters (movement of control points and compressibility).

FIGS. 15A and 15B are schematic views for explaining a case in which an ellipse representing ellipse approximation data is approximated to a perfect circle by optimizing the control parameters (movement of control points and compressibility). Note that FIGS. 15A and 15B show grid points in addition to the control points for descriptive convenience. That is, the CPU 201 approximates the ellipse representing ellipse approximation data (FIG. 15A) to a perfect circle (FIG. 15B) by moving the position of each set control point, and changing the compressibility of each control point with respect to the center.

Figure 16:
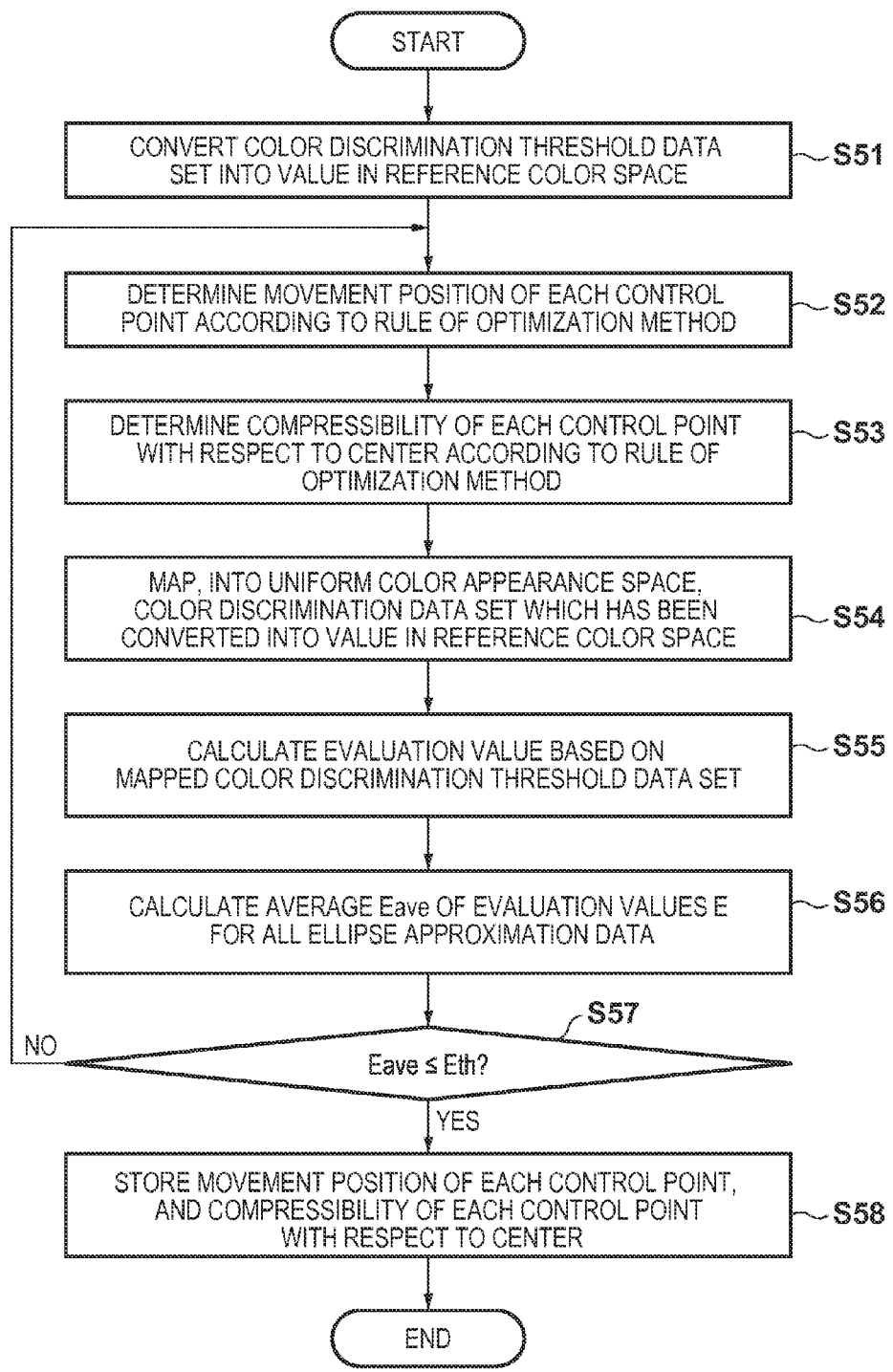
FIG. 16 is a flowchart for explaining details of the optimization processing.

FIG. 16 is a flowchart for explaining details of the optimization processing (S44). The CPU 201 converts a color discrimination threshold data set into a value in the CIELAB space (reference color space) using expression (4) (S51). Note that if the color discrimination data set already includes values in the reference color space, the conversion operation can be omitted.

if $(Y/Yw > 0.008856)$ $L^* = 116(Y/Yw)^{1/3} - 16;$ else $L^* = 903.29 \times Y/Yw;$ if $(X/Xw > 0.008856)$ $f(X/Xw) = (X/Xw)^{1/3};$ else $f(X/Xw) = 7.78 \times X/Xw + 16/116;$ if $(Y/Yw > 0.008856)$ $f(Y/Yw) = (Y/Yw)^{1/3};$ else $f(Y/Yw) = 7.78 \times Y/Yw + 16/116;$ if $(Z/Zw > 0.008856)$ $f(Z/Zw) = (Z/Zw)^{1/3};$ else $f(Z/Zw) = 7.78 \times Z/Zw + 16/116;$ $a^* = 500\{f(X/Xw) - f(Y/Yw)\};$ $b^* = 200\{f(Y/Yw) - f(Z/Zw)\};$ (4)

where Xw, Yw, and Zw represent the X, Y, and Z values of a white point, respectively.

As a white point for calculation, a white point in an environment (to be referred to as an "observation environment" hereinafter) where color is actually observed is used. If the environment of creation of a color discrimination threshold data set is different from the observation environment, therefore, the CPU 201 preferably executes processing of converting CIE tristimulus values X, Y, and Z of the color discrimination data set into X, Y, and Z values in the observation environment. Note that, for example, the Von Kries transformation or Bradford transformation is used for conversion into X, Y, and Z values in the observation environment.

The CPU 201 executes processing using an optimization method such as the Newton's method, damped least squares method, or steepest descent method. That is, according to the rule of the optimization method, the CPU 201 determines the movement position of each control point (S52), and determines the compressibility of each control point with respect to the center (S53).

FIG. 17 is a graph for explaining the relationship between a control point and the center. As shown in FIG. 17, the center corresponds to an achromatic point 1103 with the same brightness as that of a control point 1102 on the L* axis. The compressibility is a parameter for determining the movement position of a point (to be referred to as an "intermediate point" hereinafter) positioned between the control point 1102 and the achromatic point 1103 with respect to the movement position of the control point 1102. FIG. 18 is a view for explaining movement of the intermediate point. The movement position of the intermediate point is determined according to:

$$\vec{x}' = (|\vec{x}|/|\vec{p}|)^{\gamma} \cdot \vec{p}' \quad (5)$$

where $\vec{x}$ represents the position vector of an intermediate point 1104, $\vec{x}'$ represents the position vector of the moved intermediate point 1104, $\vec{p}$ represents the position vector of the control point 1102, $\vec{p}'$ represents the position vector of the moved control point 1102, and $\gamma$ represents the compressibility ($0 \leq \gamma \leq 1$).

The CPU 201 uses equation (5) and an interpolation operation to map, into the uniform color appearance space, the color discrimination threshold data set which has been converted into the CIELAB space (reference color space) (S54). FIG. 19 is a graph for explaining mapping of a color discrimination threshold data set. Assume, for example, that ellipse approximation data 1105 in a region surrounded by four control points 1102a to 1102d, and two achromatic points 1103a and 1103b. In this case, the a* component of the ellipse approximation data 1105 is projected on $\vec{pb}$ and $\vec{pd}$, and the $\sqrt{(a^{*}+b^{*})}$ component is projected on $\vec{pa}$ and $\vec{pc}$, thereby performing the operation according to equation (5). An interpolation operation is performed for the operation result to obtain ellipse approximation data after mapping. Note that the interpolation operation is performed by an arbitrary method and can be linear or non-linear interpolation.

The CPU 201 calculates an evaluation value based on color discrimination threshold data set after mapping (S55). The evaluation value need only be a value which indicates the similarity of an ellipse representing the converted ellipse approximation data to a perfect circle, and is obtained according to:

$$E = \Sigma_{i=1}^{4} [1 - \sqrt{\{(L^{*}_{c} - L^{*}_{i})^{2} + (a^{*}_{c} - a^{*}_{i})^{2} + (b^{*}_{c} - b^{*}_{i})^{2}\}}]/4 \quad (6)$$

where an evaluation value E becomes zero if the ellipse representing the converted ellipse approximation data is a perfect circle. Note that ($L^{*}_{c}, a^{*}_{c}, b^{*}_{c}$) represents the coordinates of the center of the converted ellipse approximation data, and ($L^{*}_{i}, a^{*}_{i}, b^{*}_{i}$) represents the coordinates of an end point of the converted ellipse approximation data.

The CPU 201 calculates an average Eave of the evaluation values E for all the ellipse approximation data (S56), and determines whether the average Eave is smaller than a predetermined threshold Eth (S57). The threshold Eth is adjusted according to the accuracy with which the gradation uniformity of a color space is obtained. If the average evaluation value is larger than the threshold (Eave>Eth), the process returns to step S52 to repeat the processing in steps S52 to S56 until the average evaluation value becomes equal to or smaller than the threshold (Eave≤Eth). If Eave≤Eth is satisfied, the CPU 201 determines that optimization has converged.

If optimization has converged, the CPU 201 stores, in a predetermined area of the main memory 202, the movement position of each control point (the coordinates of 24 points) and the compressibility of each control point with respect to the center (24 γ values) (S58), which have been obtained as an optimization result.

That is, a control region is set in the reference color space, and control points are set on the boundary of the control region. The position of each control point and the compressibility of the control point with respect to the center are used as control parameters to approximate the ellipse representing the color discrimination threshold data set to a perfect circle, thereby generating a correction table for converting the reference color space into the uniform color appearance space. According to such a correction table, it is possible to covert the reference color space into the uniform color appearance space in which no sudden local change occurs but a gradual change occurs.

As described above, by converting data included in an existing profile into data in a uniform color appearance space, and evaluating and modifying the hue linearity and gradation uniformity of the profile in the uniform color appearance space, it is possible to immediately and appropriately modify the uniformity of appearance of the profile. Note that the correction table generation method is not limited to the above example, and any method can be used as long as it is possible to generate a table for converting an existing color space into a uniform color appearance space.

Second Embodiment

A color processing apparatus and a color processing method according to the second embodiment of the present invention will be described below. Note that in the second embodiment, the same components as those in the first embodiment have the same reference numerals, and a detailed description thereof will be omitted.

In the first embodiment, a method of correcting a profile in the ICC profile format has been described. In the second embodiment, a case in which a device link profile is corrected will be described.

Figure 20:
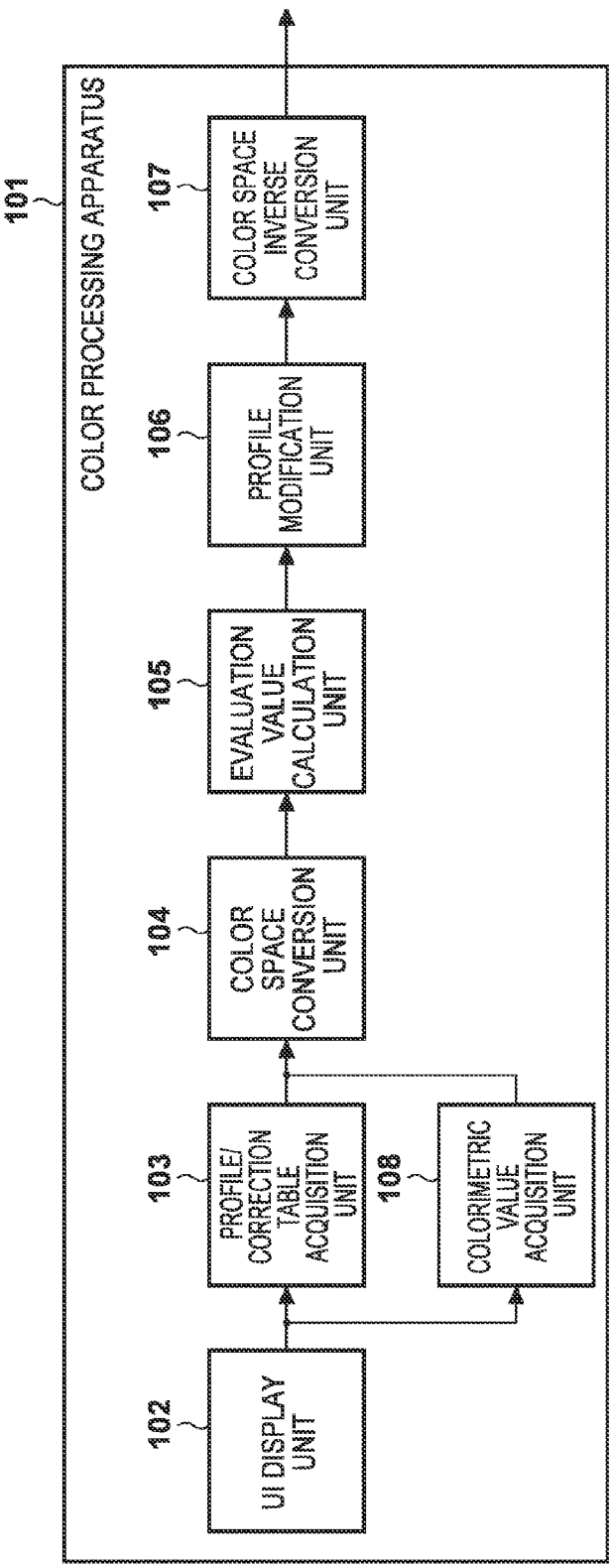
FIG. 20 is a block diagram showing the logical configuration of a color processing apparatus according to the second embodiment.

FIG. 20 is a block diagram showing the logical configuration of a color processing apparatus 101 according to the second embodiment. In FIG. 20, a different point from the first embodiment (FIG. 4) is that a colorimetric value acquisition unit 108 is added. The configuration of a UI provided by a UI display unit 102 and processing by a color space conversion unit 104 are also different from those in the first embodiment.

Figure 21:
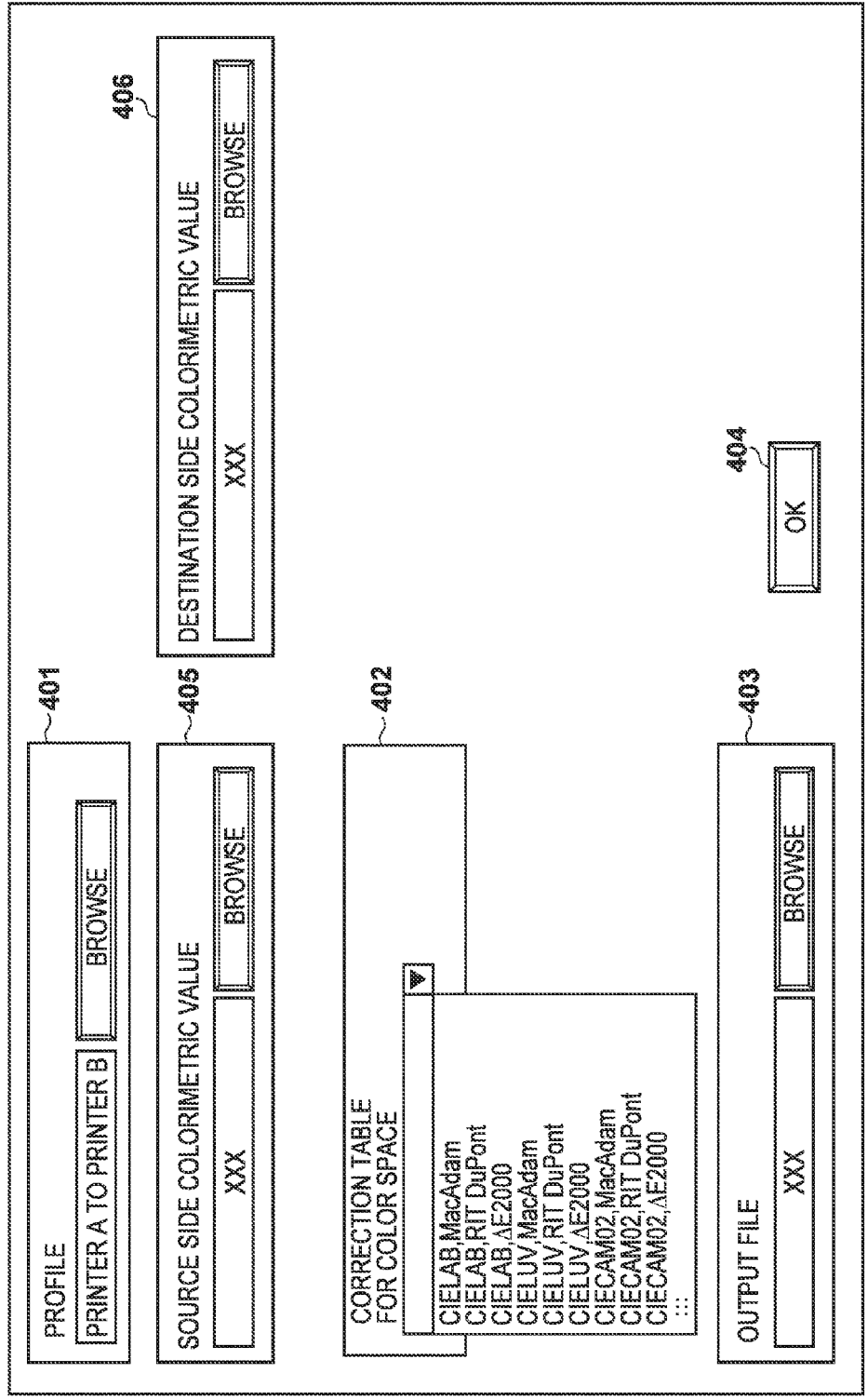
FIG. 21 is a view showing an example of a UI provided by a UI display unit.

FIG. 21 shows an example of the UI provided by the UI display unit 102. The UI is different from that shown in FIG. 5 in that an instruction input unit 405 for a source side colorimetric value and an instruction input unit 406 for a destination side colorimetric value are added. Note that FIG. 21 shows an example of a state in which a device link profile "printer A to printer B" has been set in an instruction input unit 401.

Although a correspondence between a device-dependent signal value and a PCS value is identified in the ICC profile, only correspondence between a signal value dependent on a source apparatus and that dependent on a destination apparatus is identified in the device link profile. It is, therefore, impossible to perform conversion into a uniform color appearance space only by acquiring the device link profile. To deal with this problem, a colorimetric value CVsrc of the source apparatus and a colorimetric value CVdst of the destination apparatus, which have been used to design and generate the device link profile, are acquired, and conversion into the uniform color appearance space and correction are performed based on the acquired colorimetric values.

According to user instructions input through the instruction input units 405 and 406, the colorimetric value acquisition unit 108 acquires colorimetric values from an HDD 203 or recording medium 208. The colorimetric value may be a psychophysical quantity such as tristimulus values X, Y, and Z, or a value in a standard color space such as a CIELAB value or CIELUV value. Note that if tristimulus values X, Y, and Z are acquired, a CIEXYZ value is converted into a value in a standard color space such as a CIELAB value. Assume in the following description that the colorimetric value is a CIELAB value.

The color space conversion unit 104 executes interpolation processing to obtain a CIELAB value LABsrc for the input signal value of the device link profile based on CVsrc, and obtain a CIELAB value LABdst for the output signal value of the device link profile based on CVdst. When the CIELAB values for input and output signal values are calculated, LABsrc and LABdst are converted into values in the uniform color appearance space by referring to a correction table.

As described above, it is possible to convert LABsrc and LABdst into values LABsrc' and LABdst' in the uniform color appearance space, respectively, by performing an interpolation operation based on the correction table. As in the first embodiment, an evaluation value calculation unit 105 calculates an evaluation value based on LABsrc' and LABdst'. A profile modification unit 106 modifies LABdst' if necessary. A color space inverse conversion unit 107 calculates a signal value for the destination apparatus, which corresponds to the modified value LABdst', and changes the output signal value of the device link profile, thereby correcting the device link profile.

As described above, for the device link profile, it is possible to immediately and appropriately modify the uniformity of appearance of the device link profile using the colorimetric values in generation of the profile.

Third Embodiment

A color processing apparatus and a color processing method according to the third embodiment of the present invention will be described below. Note that in the third embodiment, the same components as those in the first and second embodiments have the same reference numerals, and a detailed description thereof will be omitted.

In the first and second embodiments, a method of correcting a profile based on predetermined determination and modification criteria has been described. In the third embodiment, a method of correcting a profile by setting determination and modification criteria according to user instructions will be described.

Figure 22:
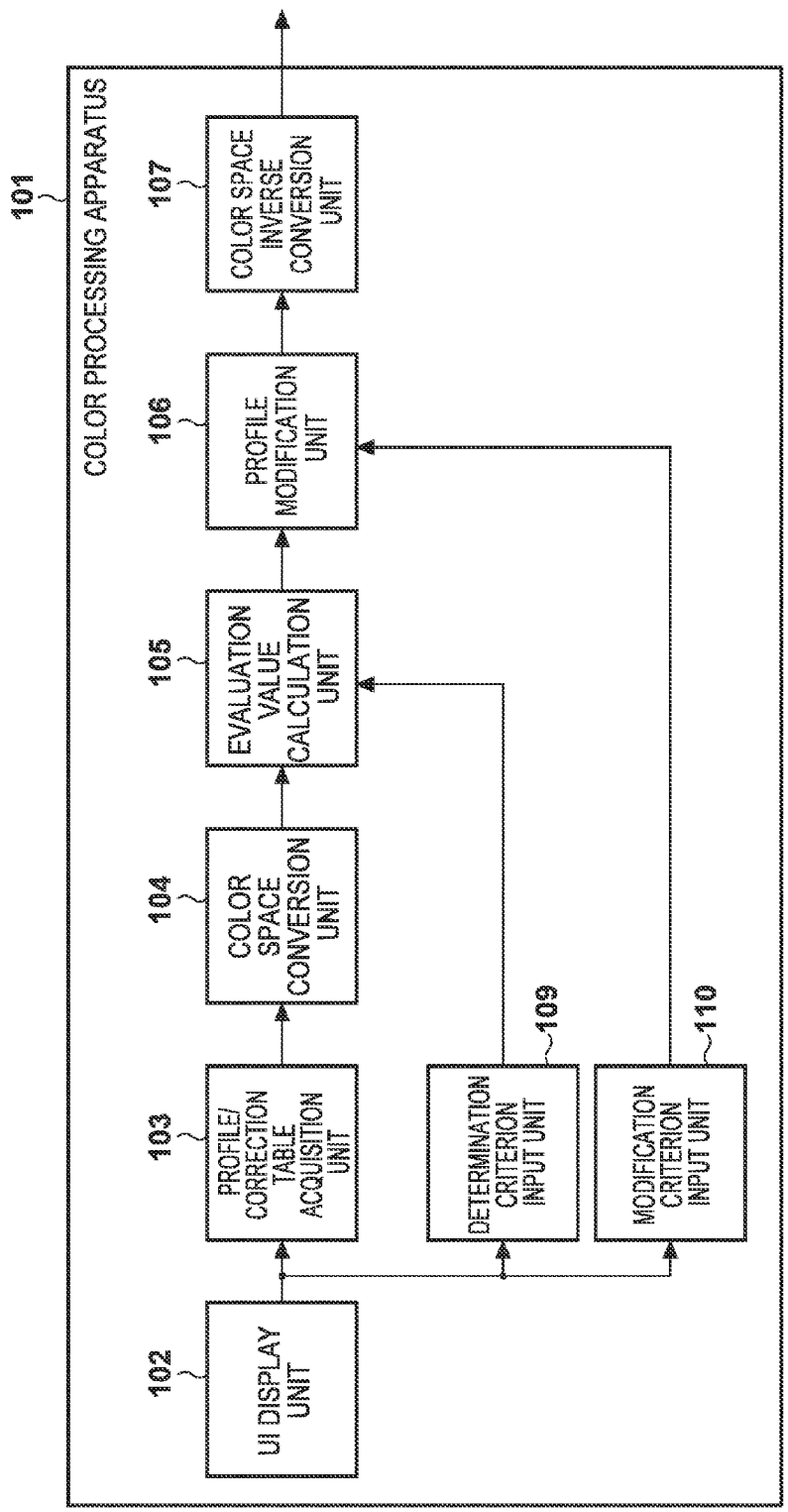
FIG. 22 is a block diagram showing the logical configuration of a color processing apparatus according to the third embodiment.

FIG. 22 is a block diagram showing the logical configuration of a color processing apparatus 101 according to the third embodiment. In FIG. 22, a different point from the first embodiment (FIG. 4) is that a determination criterion input unit 109 and a modification criterion input unit 110 are added. The configuration of a UI provided by a UI display unit 102 is also different from that in the first embodiment.

Figure 23:
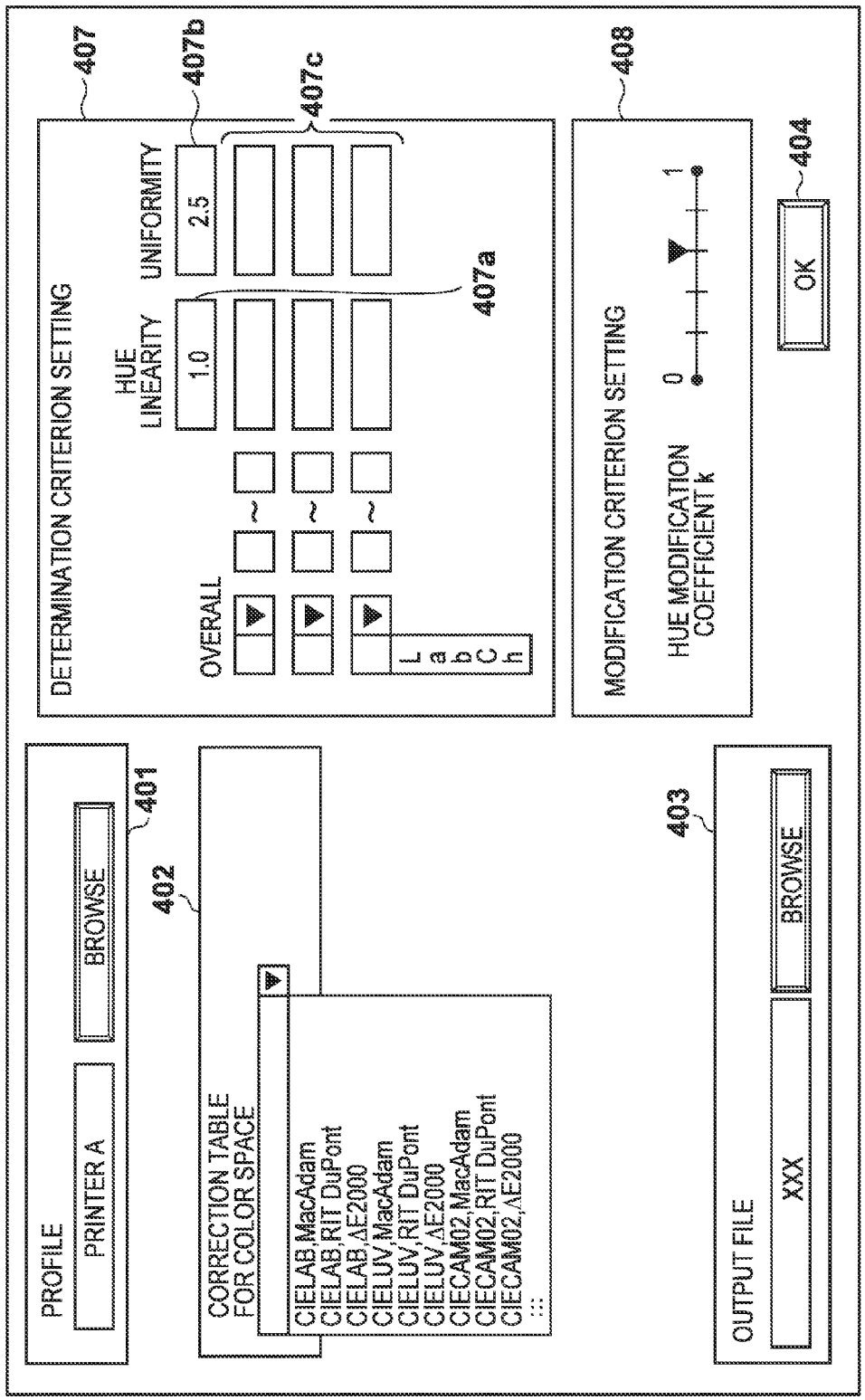
FIG. 23 is a view showing an example of a UI provided by a UI display unit.

FIG. 23 shows an example of the UI provided by the UI display unit 102. The UI is different from that in the first embodiment (FIG. 5) in that a determination criterion setting unit 407 and a modification criterion setting unit 408 are added.

The user can operate the determination criterion setting unit 407 to set determination criteria in correcting a profile. That is, in the first embodiment, ΔHmax<3.0 is an example of a determination criterion for the hue linearity, and Dmin>2.0 is an example of a determination criterion for the gradation uniformity. In the third embodiment, the user can arbitrarily set these determination criteria. If, for example, ΔHmax<1.0 is set, it is possible to further improve the degree of matching of the hues. When an "OK" button 404 is pressed, the determination criterion input unit 109 sets, in an evaluation value calculation unit 105, the determination criteria input to the determination criterion setting unit 407.

The user can operate the modification criterion setting unit 408 to set a value of a coefficient k to be used to modify the hue linearity. That is, the user can adjust the value of the coefficient k between 0 and 1 to set whether modification of a hue difference or the continuity with surrounding grid points has priority. Note that as the coefficient k is closer to 1, the amount of modification of a hue has higher priority. As the coefficient k is closer to 0, the continuity with surrounding grid points has higher priority. When the "OK" button 404 is pressed, the modification criterion input unit 110 sets, in a profile modification unit 106, the modification criterion input to the modification criterion setting unit 408.

Values input to input units 407a and 407b of the determination criterion setting unit 407 serve as determination criteria for the whole region. On the other hand, if an input unit 407c is used, determination criteria can be input for each color region. For example, for a profile for which the hue of a skin color region is changed to preferably reproduce a skin color, if the hue value of the skin color is modified, it may be impossible to reproduce the skin color with preferred color. By setting, through the input unit 407c, ΔHmax<20.0 as a determination criterion for the hue linearity only for a hue region around the skin color, it is possible to prevent the hue from being modified. It is possible to set, through the input unit 407c, Dmin>0.0 as a determination condition for the gradation uniformity of a grid point with a chroma value C equal to or larger than a given value not to modify the gradation uniformity for a grid point outside a visible range.

Note that if different determination criteria are set for each color region, the evaluation value calculation unit 105 calculates an evaluation value for each color region, and determines whether the calculated evaluation value satisfies the determination criteria.

FIG. 24 shows another example of the UI provided by the UI display unit 102. The user can operate a determination criterion setting unit 409 shown in FIG. 24 to change the determination criteria by rendering intents. For example, a saturation intent for giving priority to the chroma is used to set a determination criterion for the hue linearity not to modify the hue linearity for giving priority to brightness. That is, determination criteria for the hue linearity and gradation uniformity can be individually set for the saturation intent, a perceptual intent, an absolute colorimetric intent, and a relative colorimetric intent.

Providing such a UI enables the user to freely set arbitrary determination criteria, thereby allowing more appropriate correction of a profile according to the user's intention.

Modification of Embodiments

A case in which the profile modification unit 106 modifies the hue linearity, and then modifies the gradation uniformity has been described above. The modification method, however, is not limited to this. For example, the gradation uniformity may be modified first. Although a case in which a hue value is not changed in modifying the gradation uniformity has been explained, modification including changing a hue value may be performed by, for example, repeating modification of the hue linearity and gradation uniformity.

Furthermore, although the CIELAB space has been exemplified as a reference color space, the CIELUV space, the JCh space using CIECAM02, or the like may be used as a reference color space.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264126, filed Dec. 1, 2011, which is hereby incorporated by reference herein in its entirety.

What is claimed is:

1. A color processing apparatus comprising:
an acquisition section configured to acquire a profile of a reference color space;
a converter configured to convert the acquired profile into a profile of a uniform color appearance space which is a color space different from the reference color space;
a calculator configured to calculate an evaluation value of color in the profile of the uniform color appearance space;
a modifier configured to correct the profile of the uniform color appearance space based on the calculated evaluation value; and
an inverse converter configured to inversely convert the corrected profile into the profile of the reference color space,
wherein the evaluation value comprises a value for hue linearity in the profile of the uniform color appearance space, and at least one of the acquisition section, the converter, the calculator, the modifier, and the inverse converter is implemented using a processor.

2. The apparatus according to claim 1, wherein the evaluation value further comprises a value for evaluating gradation uniformity in the profile of the uniform color appearance space.

3. The apparatus according to claim 1, wherein the reference color space is a color space in a case where the profile acquired by the acquisition section is designed, and the uniform color appearance space is a uniform color space for human appearance, which is obtained by correcting uniformity of appearance of the reference color space.

4. The apparatus according to claim 3, wherein the acquisition section further acquires a correction table indicating a correspondence between a value in the reference color space and a value in the uniform color appearance space.

5. The apparatus according to claim 4, wherein the profile acquired by the acquisition section includes a first table representing conversion from a color value in the reference color space into a device-dependent signal value, and a second table representing conversion from the device-dependent signal value into the color value in the reference color space,
wherein the converter converts a color value of a grid point of the first table into a first color value in the uniform color appearance space by referring to the correction table, and
wherein the converter converts a device-dependent signal value set to a grid point of the first table into a color value in the reference color space using the second table, and converts the color value obtained by the conversion operation in the reference color space into a second color value in the uniform color appearance space by referring to the correction table.

6. The apparatus according to claim 5, wherein the calculator calculates an absolute difference between a hue value indicated by the first color value of each grid point of the profile of the uniform color appearance space and a hue value indicated by the second color value, and uses a maximum value of the calculated absolute differences as an evaluation value of the hue linearity in the profile of the uniform color appearance space.

7. The apparatus according to claim 6, wherein the modifier modifies the hue value of the second color value of a grid point for which the evaluation value of the hue linearity does not satisfy a predetermined determination criterion or a determination criterion input by a user.

8. The apparatus according to claim 7, wherein the inverse converter converts the modified second color value into a third color value in the reference color space by referring to the correction table, and converts the third color value into a device-dependent signal value by referring to the first table, thereby updating the first table based on the third color value and the device-dependent signal value.

9. The apparatus according to claim 7, further comprising an input section configured to input the determination criterion.

10. The apparatus according to claim 7, further comprising an input section configured to input the determination criterion for each color region or each rendering intent.

11. The apparatus according to claim 7, further comprising an input section configured to input a modification criterion indicating an amount of the modification.

12. The apparatus according to claim 11, wherein the inverse converter converts the modified second color value into a third color value in the reference color space by referring to the correction table, and converts the third color value into a device-dependent signal value by referring to the first table, thereby updating the first table based on the third color value and the device-dependent signal value.

13. The apparatus according to claim 11, further comprising an input section configured to input the determination criterion.

14. The apparatus according to claim 11, further comprising an input section configured to input the determination criterion for each color region or each rendering intent.

15. The apparatus according to claim 1, wherein the acquisition section acquires a device link profile, and the inverse converter inversely converts the corrected profile into the device link profile.

16. The apparatus according to claim 15, further comprising a colorimetric value acquisition section configured to acquire colorimetric values used to generate the device link profile,
wherein the converter converts the device link profile into the profile of the uniform color appearance space using the colorimetric values.

17. A color processing method comprising:
using a processor to perform the steps of:
acquiring a profile of a reference color space;
converting the acquired profile into a profile of a uniform color appearance space which is a color space different from the reference color space;
calculating an evaluation value of color in the profile of the uniform color appearance space;
correcting the profile of the uniform color appearance space based on the calculated evaluation value; and
inversely converting the corrected profile into the profile of the reference color space,
wherein the evaluation value comprises a value for evaluating hue linearity in the profile of the uniform color appearance space.

18. A method of generating a profile comprising:
using a processor to perform the steps of:
acquiring a profile of a reference color space;
converting the acquired profile into a profile of a uniform color appearance space which is a color space different from the reference color space;
calculating an evaluation value of color in the profile of the uniform color appearance space; and
generating a profile by correcting the profile of the uniform color appearance space based on the calculated evaluation value, and inversely converting the corrected profile into the profile of the reference color space,
wherein the evaluation value comprises a value for evaluating hue linearity in the profile of the uniform color appearance space.

19. A non-transitory computer readable medium storing a computer-executable program for causing a computer to perform a color processing method, the method comprising the steps of:
acquiring a profile of a reference color space;
converting the acquired profile into a profile of a uniform color appearance space which is a color space different from the reference color space;
calculating an evaluation value of color in the profile of the uniform color appearance space;
correcting the profile of the uniform color appearance space based on the calculated evaluation value; and
inversely converting the corrected profile into the profile of the reference color space,
wherein the evaluation value comprises a value for evaluating hue linearity in the profile of the uniform color appearance space.

20. A non-transitory computer readable medium storing a computer-executable program for causing a computer to perform a method of generating a profile, the method comprising the steps of:
acquiring a profile of a reference color space;
converting the acquired profile into a profile of a uniform color appearance space which is a color space different from the reference color space;
calculating an evaluation value of color in the profile of the uniform color appearance space; and
generating a profile by correcting the profile of the uniform color appearance space based on the calculated evaluation value, and inversely converting the corrected profile into the profile of the reference color space,
wherein the evaluation value comprises a value for evaluating hue linearity in the profile of the uniform color appearance space.

* * * * *